Patented Sept. 27, 1938

2,131,685

UNITED STATES PATENT OFFICE 2,131,685

ALKALI PROCESS FOR RECLAIMING RUBBER WASTE

Ernest Bemelmans, Maastricht, Netherlands, assignor to Usitall Company, Inc., New York, N. Y., a corporation of New York No Drawing. Application April 11, 1936, Serial No. 73,888

2 Claims. (Cl. 18—52)

When vulcanized rubber is passed between the rolls of a rubber mixing machine or mill it forms a comminuted material and not a plastic sheet as in the case of fresh rubber. A product of this character is therefore unsuitable for producing homogeneous rubber mixtures and in order to obtain a plastic mass from vulcanized rubber it is necessary to submit it to a proper treatment.

One of the methods used to treat vulcanized rubber to render it plastic and suited to incorporation into rubber mixtures or compounds or to reuse generally, is the well known Marks alkali process. In this process the vulcanized rubber containing fibrous material is digested with a hot caustic soda solution under pressure for a period of e. g., 10–20 hours and subsequently washed, dried, strained and milled. This process is rather expensive, owing to the long duration of treatment and the cost of power, water and chemicals. A further drawback is that the textile fibre is destroyed by the alkaline liquor and removed by the subsequent washing.

This invention relates to an alkali process for reclaiming rubber scrap, which is much simpler and less expensive and which allows to produce a reclaimed rubber of superior quality in a short time, at relatively low temperatures and without using pressure, steam and water.

I have found that vulcanized rubber, waste or scrap can be reclaimed in a very easy and satisfactory manner by heating the same in the presence of an alkaline rubber swelling agent in a gaseous or vapor form to a temperature exceeding the usual vulcanizing temperature for a period sufficient to render the material plastic. According to this method a reclaimed rubber product of very good quality can be obtained at relatively low temperatures without pressure and without using steam for a period of, e. g., about two hours (although it is also possible to carry out the process under pressure and with steam, e. g., in a steam autoclave). This favourable result can be ascribed to the fact that the alkaline swelling agents in a gaseous or vapor form, in contradistinction from the alkaline liquor in the well known alkali process for reclaiming rubber, penetrate readily into the interior of the pieces of rubber scrap so that the material will swell and be converted into a plastic mass which often has a spongy character.

Ammonia and organic bases are suitable alkaline swelling agents. However, I preferably use a mixture of organic swelling agents and alkaline substances, which are both in vapor form at the temperatures and under the conditions of treatment. Hydrocarbons, such as naphthalene, and oil of turpentine are suitable organic swelling agents and they can be advantageously used in a proportion of, e. g., 2% calculated on the weight of the material to be reclaimed.

I wish it to be understood, however, that the substances mentioned above are only indicated by way of example and I wish to include all rubber swelling agents which are in vapor form at the temperatures and under the conditions of treatment.

It is not necessary to add the alkaline swelling agents as such and they can also be introduced in the form of materials containing the said alkaline swelling agents.

A preferred way for creating the alkaline atmosphere comprises introducing a material generating ammonia under the conditions of the treatment into the treating vessel. A substance suitable for this purpose is ammonium carbonate and ½–1% of this substance, calculated on the weight of the rubber waste, produces satisfactory results. The ammonium carbonate is volatilized and the vapor produced consists of the dissociation products, namely gaseous ammonia and carbon dioxide. The atmosphere in which the rubber waste is heated consequently remains permanently alkaline and this has a very favourable action on the properties of the reclaimed product. The carbon dioxide formed also has an advantageous effect as it provides an inert atmosphere, thereby preventing the material from being oxidized.

The process is preferably carried out in a closed vessel in which means for distributing the heat through the material are provided, keeping the atmosphere in motion being one of the means suitable for the purpose. The alkaline swelling atmosphere has an energetic plasticizing action on the scrap and it is therefore unnecessary to comminute the scrap prior to the reclaiming process.

It is a well known fact that in the usual alkali reclaiming process the rubber scrap must be ground as otherwise satisfactory results are not obtained. This mechanical treatment, however, requires a great deal of power and a lot of machinery which makes the process very expensive. By the process of the invention vulcanized rubber articles either containing fibrous textile materials or not, such as pneumatic tires, solid tires, air bags and inner tubes can be reclaimed in non-comminuted form, which is of substantial value from an economical point of view.

There is another considerable advantage in reclaiming the rubber scrap in substantially non-comminuted form namely that after the heating process the hot pieces of scrap can be immediately removed from the container. In reclaiming processes of comminuted rubber scrap it is necessary to cool the same in the apparatus to a sufficiently low temperature in order to prevent the rubber from being oxidized by contact with the air. It is a well known fact that rubber in comminuted form is readily oxidized at elevated temperatures and in some cases spontaneous ignition will even occur. Oxidation is naturally much slower when the scrap material is present in the form of large pieces and cooling down the material to a low temperature before admitting the air is therefore unnecessary in this case.

As the rubber scrap is heated in a dry or substantially dry alkaline atmosphere the material is delivered from the apparatus in dry condition, in contradistinction from the product obtained in the usual wet alkali reclaiming process which has to be subjected to a drying operation. In the last mentioned case the product after being heated with the alkaline liquor must also be washed to remove the alkali present in the comminuted material whereas in the present case such a washing process is unnecessary, as the alkaline substance is practically completely removed by opening the vessel, in which the scrap material has been heated.

For rubber scrap containing textile fibrous material the new method is very economical because at the temperatures used the fibrous material is altered by the alkaline substance but not destroyed or dissolved, so that it remains in the product, in contradistinction with the Marks process in which the fibrous material is hydrolized by the alkaline liquor and removed by subsequent washing. The altered fibrous material is completely disintegrated in the mastication process and it acts as a valuable filler in the rubber mixtures, in which the reclaimed or treated waste is used wholly or in part.

Another very unexpected result is that articles such as pneumatic tires in non-comminuted form can be easily separated in two parts, the carcass and the tread after the heating process described above so that tread and carcass reclaim are produced in one single operation. In the usual processes pneumatic tires must be separated in tread and carcass by a slitting machine, which does not lead to a full utilization of the constituents of the tire.

As compared with the wet alkali reclaiming process the method described above has the following advantages:

1. It is not essential to use pressure, water or steam. The energy required for turbo agitation is very small.

2. It is unnecessary to grind or comminute the scrap previous to the heating of same.

3. It is unnecessary to wash and to neutralize the scrap as the alkaline substances used are volatile.

4. The scrap can be cooled down to the required temperature in a very short time.

5. The reclaimed material is obtained in dry condition and can be milled without previously drying the same.

6. The fibrous material is not removed so that there is no loss of weight.

7. The time of treatment is about one tenth of that required for the Marks process.

8. The whole process is very simple and does not require much labour, so that the costs of the reclaimed product obtained according to the invention are much lower than in the case of the Marks process.

9. Owing to the relatively low heating temperature and the short time of treatment the product has more "nerve" and better physical properties. The ageing properties are excellent because the hot scrap has not been subjected to oxidizing influences.

The process according to the invention will be illustrated by the following example:

The treating vessel is filled with whole pneumatic tires and heated to a temperature of about 200° C. by suitable means. The turbo agitator is put into motion. At the beginning of the heating process the outlet valve is opened so that the steam produced from the mixture present in the carcasses can escape, at the same time driving away the air in the vessel.

As soon as the water is evaporated, 1% of ammonium carbonate and 2% of naphthalene, calculated on the weight of the scrap, are introduced into the container and the outlet valve is shut. The ammonium carbonate is decomposed into ammonia and carbon dioxide and the naphthalene is volatilized without a substantial increase of the pressure. If necessary the outlet valve can be temporarily opened to relieve the excess pressure.

The alkaline swelling vapor medium circulating in the vessel acts on the pneumatic tires and converts the material into a swollen plastic mass. The tread assumes a spongy condition and the fibrous material of the carcass is transformed into a material, which can be readily mixed in the resulting mass.

When the material is plasticized to a sufficient extent (generally within two hours), the outlet valve is opened so that the gaseous alkaline swelling medium can escape. The vessel is then opened and the hot resulting material is cooled down to a sufficiently low temperature within a few minutes. The tread can now be separated from the carcass.

The appearance of the treated pneumatic tires is not substantially changed, but when masticated on a mill they can be easily converted into a plastic sheet.

I have used the process described successfully at temperatures ranging from 150° C.–250° C., the heating period being from 75 minutes to 2 hours and 30 minutes, depending upon the temperature used and the character of the waste to be treated.

It is to be understood that the method as described above is to be regarded as merely illustrative and not as limiting the invention to these particular data. It is applicant's intention to cover all modifications within the scope of the appended claims.

I claim:

1. A process of reclaiming rubber waste comprising heating the waste in the presence of a non-aqueous vapor or gas comprising an alkaline rubber swelling agent at a temperature exceeding about 150° C. for a period of time sufficient to render the material plastic.

2. A process of reclaiming rubber waste comprising heating the waste in the presence of a non-aqueous vapor or gas comprising an alkaline rubber swelling agent and a hydro-carbon at a temperature between 150° C. and 250° C. for a period of time sufficient to render the material plastic.

ERNEST BEMELMANS.